(12) United States Patent
Weinenger

(10) Patent No.: US 9,303,584 B2
(45) Date of Patent: Apr. 5, 2016

(54) PINLESS PISTON WITH GALLERY

(71) Applicant: Federal-Mogul Corporation, Southfield, MI (US)

(72) Inventor: Michael Weinenger, Southfield, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/487,498

(22) Filed: Sep. 16, 2014

(65) Prior Publication Data

US 2015/0075456 A1 Mar. 19, 2015

Related U.S. Application Data

(60) Provisional application No. 61/878,507, filed on Sep. 16, 2013.

(51) Int. Cl.
*F02F 3/00* (2006.01)
*F16J 1/22* (2006.01)
*F02F 3/20* (2006.01)
*F16J 1/09* (2006.01)

(52) U.S. Cl.
CPC ... *F02F 3/00* (2013.01); *F02F 3/20* (2013.01); *F16J 1/09* (2013.01); *F16J 1/22* (2013.01); *F02F 2003/0007* (2013.01)

(58) Field of Classification Search
CPC ................ F16J 1/09; F16J 1/22; F16J 1/14; F02F 3/00; F02F 3/20; F02F 2003/0007; F02F 3/0015

USPC ........ 123/41.35, 197.2, 197.3, 193.6; 92/187; 74/579 R, 579 E
See application file for complete search history.

(56) References Cited

U.S. PATENT DOCUMENTS

| | | | |
|---|---|---|---|
| 1,663,612 A | 3/1928 | Reid | |
| 1,763,625 A | 6/1930 | Mellor | |
| 1,856,107 A | 5/1932 | Mellor | |
| 1,898,872 A | 2/1933 | Evanoff et al. | |
| 1,899,355 A * | 2/1933 | Reid | 403/230 |
| 1,995,570 A * | 3/1935 | Crisp | 403/131 |
| 1,996,994 A * | 4/1935 | Grubb | 403/144 |

(Continued)

FOREIGN PATENT DOCUMENTS

| | | | | |
|---|---|---|---|---|
| EP | 1538373 A1 | 6/2005 | | |
| GB | 372910 A * | 5/1932 | | F16J 1/22 |

(Continued)

OTHER PUBLICATIONS

International Search Report, mailed Jan. 29, 2015 (PCT/US2014/055813).

*Primary Examiner* — Lindsay Low
*Assistant Examiner* — Grant Moubry
(74) *Attorney, Agent, or Firm* — Robert L. Stearns; Dickinson Wright, PLLC

(57) ABSTRACT

A piston assembly having a piston member and a connecting rod. The piston member has a crown portion and a lower portion bonded together with a cooling gallery formed between them. The connecting rod has a ball end which is positioned in a socket in the piston member. In one embodiment, the ball end can have two flat surfaces and be held in position by C-clips. In another embodiment, the ball end is cylindrically shaped and the socket has a corresponding shape.

17 Claims, 6 Drawing Sheets

(56) References Cited

U.S. PATENT DOCUMENTS

| | | | |
|---|---|---|---|
| 2,297,649 A * | 9/1942 | Donaldson | 92/159 |
| 2,317,004 A | 4/1943 | Wallgren et al. | |
| 2,369,500 A | 2/1945 | Waeber | |
| 2,819,936 A * | 1/1958 | Cambeis | 92/31 |
| 3,765,307 A * | 10/1973 | Neel, Jr. | 92/187 |
| 4,372,179 A * | 2/1983 | Dolenc et al. | 74/579 E |
| 4,635,596 A * | 1/1987 | Nakano et al. | 123/197.3 |
| 4,662,319 A | 5/1987 | Ayoul | |
| 4,858,566 A | 8/1989 | Paul et al. | |
| 4,913,001 A * | 4/1990 | Watanabe et al. | 74/579 E |
| 5,115,725 A | 5/1992 | Horiuchi | |
| 5,669,285 A | 9/1997 | Wiczynski et al. | |
| 5,685,267 A * | 11/1997 | Wiczynski et al. | 123/197.3 |
| 5,762,038 A * | 6/1998 | Mielke | 123/193.6 |
| 6,334,385 B1 | 1/2002 | Wilksch et al. | |
| 6,408,813 B1 | 6/2002 | Wilksch et al. | |
| 7,290,518 B2 | 11/2007 | Ishimitsu et al. | |
| 7,395,797 B2 | 7/2008 | Ishimitsu et al. | |
| 7,451,737 B2 * | 11/2008 | Songen | 123/197.3 |
| 8,100,048 B2 * | 1/2012 | Christopher | 92/187 |

FOREIGN PATENT DOCUMENTS

| | | | | |
|---|---|---|---|---|
| JP | 06088513 A * | 3/1994 | | |
| WO | WO 9211453 A1 * | 7/1992 | | F16J 1/22 |
| WO | 2011001017 A1 | 1/2011 | | |

* cited by examiner

PINLESS PISTON WITH GALLERY

CROSS-REFERENCE TO RELATED APPLICATION

This application claims the benefit of U.S. Provisional Application Ser. No. 61/878,507, filed Sep. 16, 2013, which is incorporated herein by reference in its entirety.

TECHNICAL FIELD

This invention relates generally to internal combustion engines and more particularly to pistons and connecting members for internal combustion engines.

BACKGROUND

It is known that internal combustion engines have piston and connecting rod assemblies requiring use of a wrist pin for operable connection of a small end of the connecting rod to the piston. In particular, piston constructions are known to include a piston body with a pair of pin bosses depending from a crown of the body to a pair of axially aligned pin bores spaced laterally from one another. To transmit rotational motion to linear motion of the piston, a large end of a connecting rod is attached to a crankshaft of the engine and a small end of the connecting rod is received between the pin bosses for operable attachment to the piston via a wrist pin. To facilitate reducing friction between the wrist pin and the pin bores, it is known to insert journal bearings within the pin bores. Although these piston and connecting rod assemblies are widely accepted and useful, continual efforts are made to attain certain goals, for example, to reduce weight, to improve manufacturing efficiencies and to reduce component costs.

Pistons are known that eliminate the need for a wrist pin connection between the connecting rod and the piston body. These piston constructions provide direct attachment of the piston body to the connecting rod. The piston has a boss depending from the crown of the piston body with a single bore formed in it with a cylindrical or spherical pocket. The connecting rod is constructed generally the same as in a conventional piston, with a shank extending to a small end. The small end, however, rather than providing a wrist pin bore, has an outer surface that extends laterally outwardly from sides of the shank to provide a cylindrical or spherical surface for receipt in the bore pocket.

A piston constructed in accordance with the present invention, eliminates the need for a wrist pin, and provides further advancement in the attainment of the goals mentioned above, in addition to others that will be readily recognized by those skilled in the art of piston assemblies. It is also an object of the present invention to provide improved steel pistons which are relatively light in weight (i.e. have less mass) and which can be adequately cooled to prevent overheating.

SUMMARY OF THE INVENTION

A piston and connecting rod assembly includes a piston body extending along a central axis with an upper crown and a boss depending from the crown along the central axis. The boss has opposite sides extending along opposite sides of the central axis to a free end, as well as a pocket for receipt of the small end of a connecting rod. The boss further includes an opening extending through the free end into the pocket. The assembly further includes a connecting rod terminating at a small end with a ball-type shape configured for receipt in the pocket and with a shank extending to the other end configured for operable attachment to a crankshaft.

The piston is made of a steel material which provides strength and durability, and which can withstand higher temperatures and pressures than non-steel pistons. The pistons are made in two parts, an upper crown portion and a lower boss or body portion. One or both parts can be made by a forging or equivalent manufacturing process. The upper crown portion contains all or a portion of the combustion bowl, and can contain one or more of the ring grooves on the side wall portion. The lower body portion contains the side walls and can contain one or more of the ring grooves.

The two portions are permanently bonded together, such as by friction welding or induction welding. A cooling gallery is provided between the crown portion and body portion. Oil circulated into and through the cooling gallery maintains the upper crown portion and its rim from overheating.

During assembly of the piston and connecting rod in accordance with one embodiment of the invention, the ball end is inserted from the lower open end of the boss rotated 90° from the operating position of the connecting rod. This allows the flat portion of the ball end to enter the pocket. The rod is then rotated 90° to its operating position. A pair of C-clips are installed in place to prevent the piston from rotating relative to the rod.

Another embodiment of the invention includes a connecting rod with a cylindrical member at the upper or small end, and a piston member with a cylindrically shaped socket. In this embodiment, the connecting rod is connected to the piston member by sliding the small end into the socket transverse to the longitudinal direction of the connecting rod.

A piston and connecting rod assembly manufactured in accordance with the present invention, among other things that will be readily recognized by one of ordinary skill in the art of pistons, reduces the number of components in the piston assembly, reduces the compression height of the piston assembly, decreases the reciprocating mass of the piston assembly, and provides the piston assembly and associated components with a long and useful life.

Other features and details of the present invention will become apparent from the following description of the invention when viewed in accordance with the attached drawings and appended claims.

BRIEF DESCRIPTION OF THE DRAWINGS

These and other aspects, features and advantages of the invention will become readily apparent to those skilled in the art in view of the following detailed description of the presently preferred embodiments, appended claims, and accompanying drawings, in which:

DESCRIPTION OF THE PREFERRED EMBODIMENTS

Figure 1:
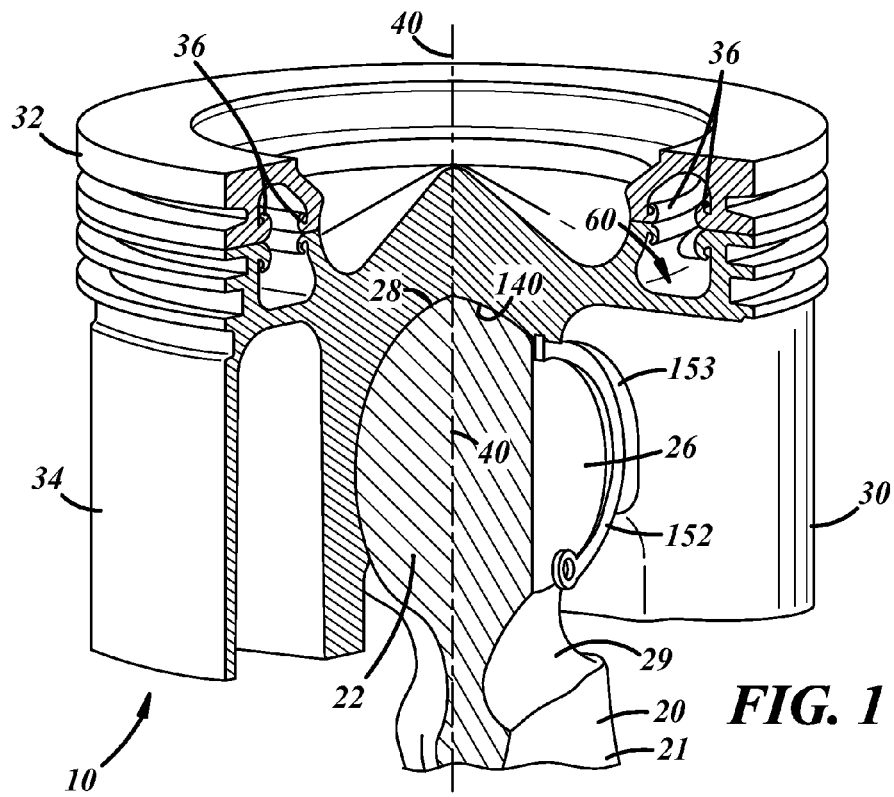
FIG. 1 is a partial cut-away perspective view of an exemplary embodiment of a piston and connecting rod in accordance with the present invention.

Referring to the drawings, wherein like numerals indicate corresponding parts throughout the several views, a piston and connecting rod assembly 10 is shown. This assembly 10 is only an exemplary embodiment of the present invention and is not to be viewed as the only embodiment of the invention. The present invention is only to be limited by the scope of the claims as they eventually are issued in a patent, and not by any feature or details as shown in the drawings or as specifically described in the following description.

Figure 3:
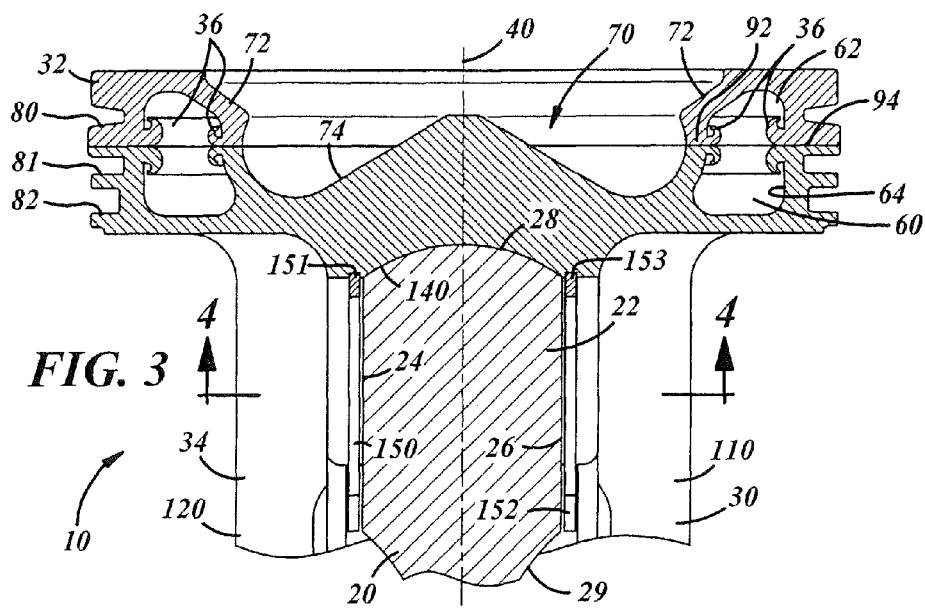
FIG. 3 is a cross-sectional view of the exemplary embodiment of the present invention as shown in FIG. 1.

The assembly 10 includes a piston 30 and a connecting rod 20. The piston 30 has a central elongated axis 40. The connecting rod 20 also has a central elongated axis 50. The two axes are in alignment when the connecting rod is located perpendicular to the piston, as shown in FIG. 3.

Figure 2:
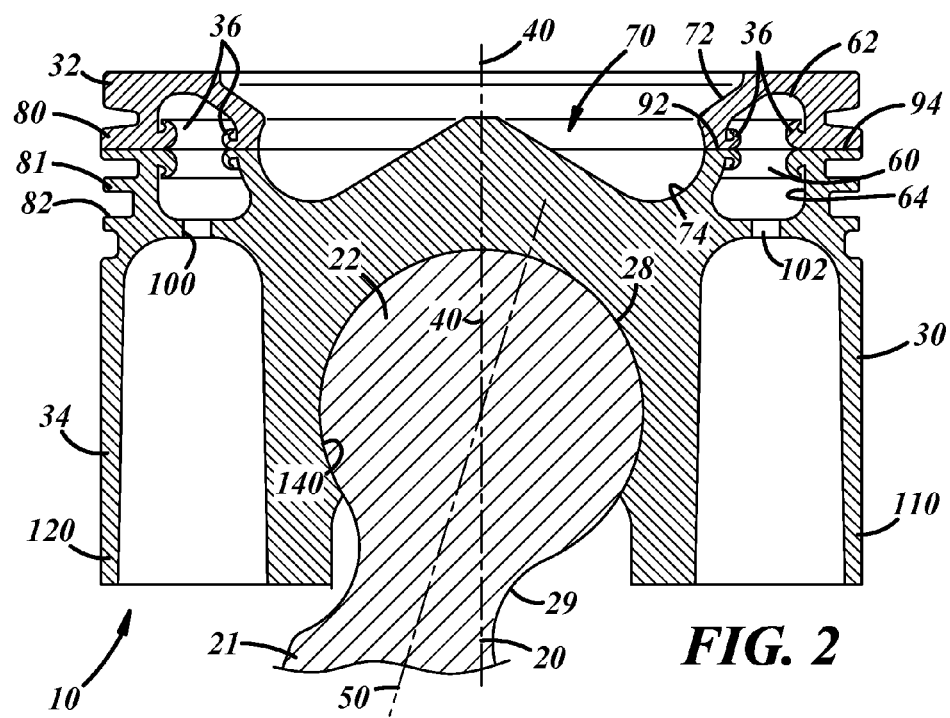
FIG. 2 is a cross-sectional view of the exemplary embodiment of the present invention as shown in FIG. 1.
Figure 4:
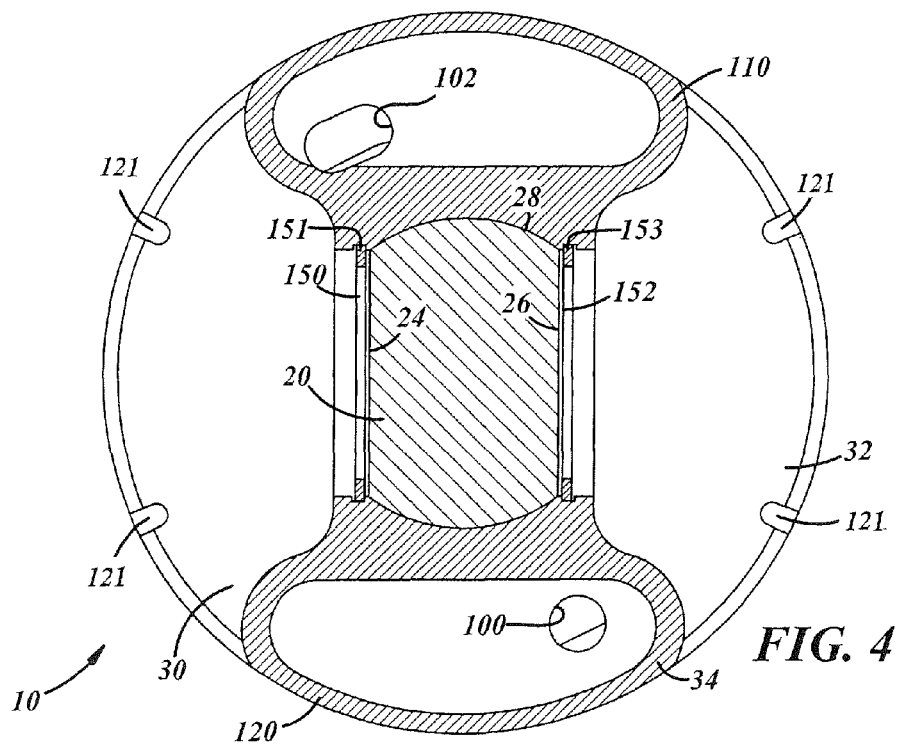
FIG. 4 is a cross-sectional view of the embodiment shown in FIG. 3, the cross-section being taken along line 4-4 in FIG. 3 and in the direction of the arrows.
Figure 5:
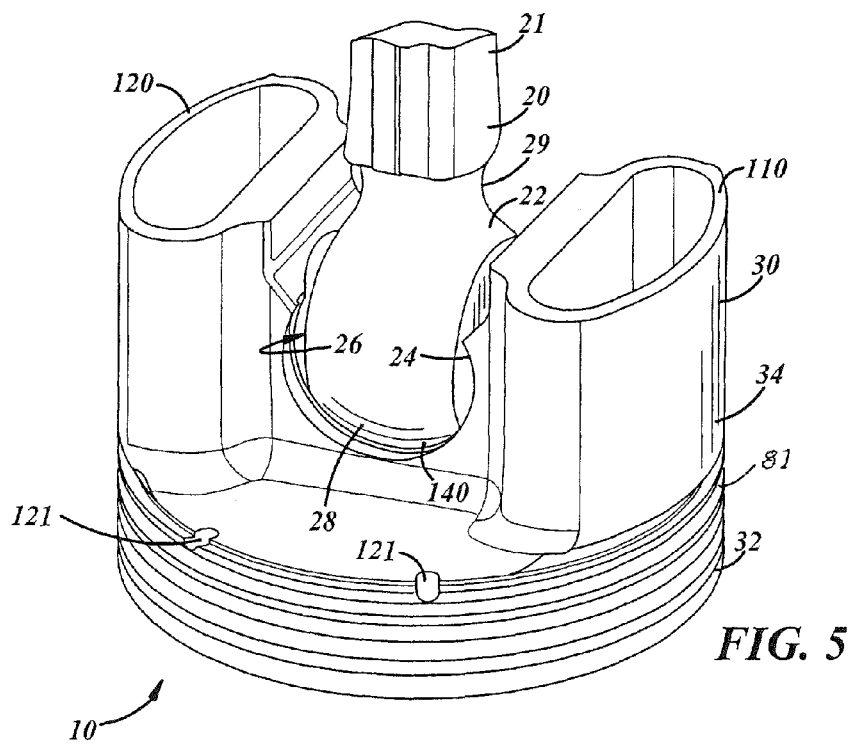
FIG. 5 is another perspective view of the FIG. 1 exemplary embodiment of a piston and connecting rod in accordance with the present invention.

In the drawings, FIG. 1 is a partial cut-away exemplary embodiment of the assembly 10. The depiction has a cut-away section in order to expose the connection of the piston and connecting rod in a clearer manner. FIGS. 2 and 3 are cross-sections of the exemplary embodiment shown in FIG. 1, with the two cross-sections being taken 90° to each other. FIG. 4 is a cross-sectional view taken along line 4-4 in FIG. 3 and looking up toward the crown from the bottom of the piston. FIG. 5 is a perspective view of the FIG. 1 embodiment viewing the assembly 10 generally from the bottom of the piston.

The connecting rod 20 is used to connect the piston to the crankshaft of the engine (not shown). The connecting rod has a large end (not shown) that attaches the rod to the crankshaft. The large end of the connecting rod is the same or similar to connecting rods well known today and does not need any further description here.

The upper or small end 22 of the connecting rod 20 is shown in FIGS. 1-3 and 5. The small end 22 is also called the "ball end" of a connecting rod. The ball end 22 has two flat sides 24 and 26, and a spherical shaped portion 28 in-between the two flat sides. The connecting rod 20 also preferably has a narrow "neck-type" portion 29 between the main stem 21 of the rod 20 and the ball end 22.

The connecting rod 20 is typically made of a steel or durable metal material and can be made from a machined, forged or powered metal process, all as known in the industry.

The piston member 30 is made of two parts, an upper or crown portion 32 and a lower or body portion 34. The body portion is also called the skirt portion. Both portions are made of a steel material and preferably made by a forging process. The two parts 32 and 34 are machined and finished as necessary and then permanently bonded together to form the piston member 30. The two parts are preferably joined together by friction welding or induction welding. The curved tailings 36 shown in FIGS. 1-3 are typical of a friction welding process.

A cooling gallery 60 is formed in the piston member 30 when the crown portion 32 and body portion 34 are bonded together. The upper portion 62 of the cooling gallery is formed in the crown portion 32 and the lower portion 64 is formed in the body portion 34. In the exemplary embodiment shown, the combustion bowl 70 is also formed by two portions 72 and 74 included in the two piston parts 32 and 34. In other embodiments, the combustion bowl could be formed entirely in the crown portion, or in the lower portion.

In addition, in the exemplary embodiment shown, grooves 80, 81, 82 for the piston rings are provided in part in each of the two portions 32 and 34. It is possible in other embodiments to include all of the ring grooves in one or the other of the crown portion or skirt portion.

In order to effectively friction weld together the crown portion and lower portion mating annular surfaces 92 and 94 are provided. This is particularly shown in FIGS. 2 and 3.

Once the two portions are bonded together, the outer sidewall surface and combustion bowl surface are machined which removes the tailing residues which are formed from the bonding process. The curved tailings 36 in the cooling gallery 60 are not removed.

In order to allow cooling oil to be introduced into the cooling gallery and to be drained from it, openings 100 and 102 are provided. These are typically drilled or machined before the two parts of the piston are bonded together. These are also shown in FIG. 4. Opening 102 is an ingress opening and can have an oval shape as shown, particularly if the oil jet supplying the oil sprays the oil from an angle.

When the lower portion is formed, it preferably has two opposing elongated boss members 110 and 120. These are preferably hollow generally cylindrically shaped members as shown in FIG. 5. The members add the structure and sidewalls needed to form the piston 30 and are hollow principally to decrease the weight and mass of the piston. The hollow boss members 110 and 120 also allow access to the cooling gallery to form the oil ingress and egress openings 100 and 102.

Although two openings are shown in the cooling gallery to introduce and drain the oil, the precise number is not critical. The number, size and shape of the openings, also do not have to be the same for ingress and egress of the oil.

The cooling gallery 60 shown in the preferred embodiment is a "closed" oil gallery. It is also possible in accordance with an alternate embodiment of the invention, to provide an "open" gallery without a floor member.

A plurality of slots 121 are provided in the piston 30 in order to drain oil from the lowermost ring groove 81. These are depicted in FIGS. 4 and 5.

The socket 140 (also called "pocket") in the piston from the ball end 22 of the connecting rod 20 is machined in the lower portion 34 of the piston and immediately below the combustion bowl 70. As shown in the drawings, the pocket is spherically shaped in order to conform to the curved surface 28 on the ball end. When the piston assembly 10 is in use in an engine, the ball end pivots in the pocket during each stroke.

A pair of C-clips 150, 152 are provided to prevent the connecting rod 20 from separating form the piston member 30. The C-clips are positioned in grooves 151, 153 formed in the power portion 34. Other methods of securing and holding the connecting rod in the piston body could also be used.

When the piston assembly 10 is assembled, the connecting rod 20 is longitudinally rotated 90° from its operating position so that the ball end can be positioned in the pocket 140. Once the end of the ball end 22 is positioned in the pocket, the rod 20 is rotated longitudinally 90° to its operating position. This is shown in FIGS. 1-3 and 5. Thereafter, the C-clips 150 152 are installed in position to prevent any further relative longitudinal rotation of the rod 20 relative to the piston member 30.

Figure 6:
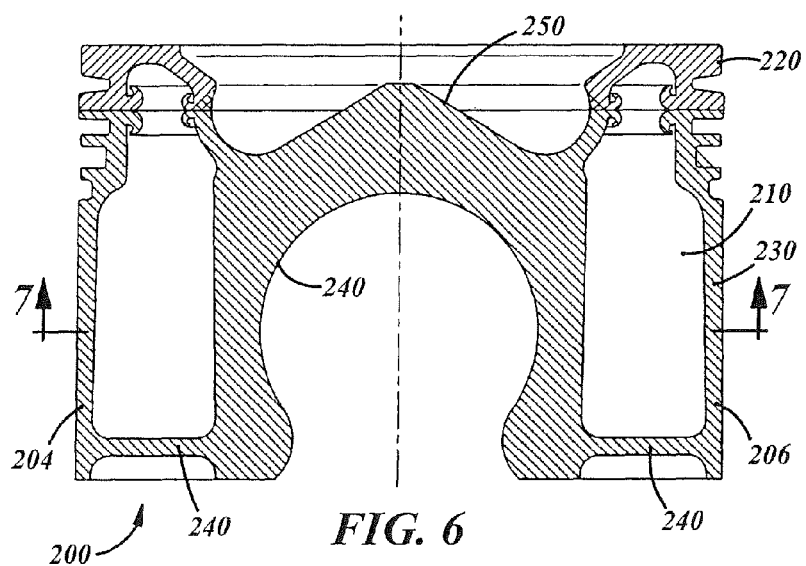
FIGS. 6, 7 and 8 depict an alternate embodiment of the present invention.
Figure 7:
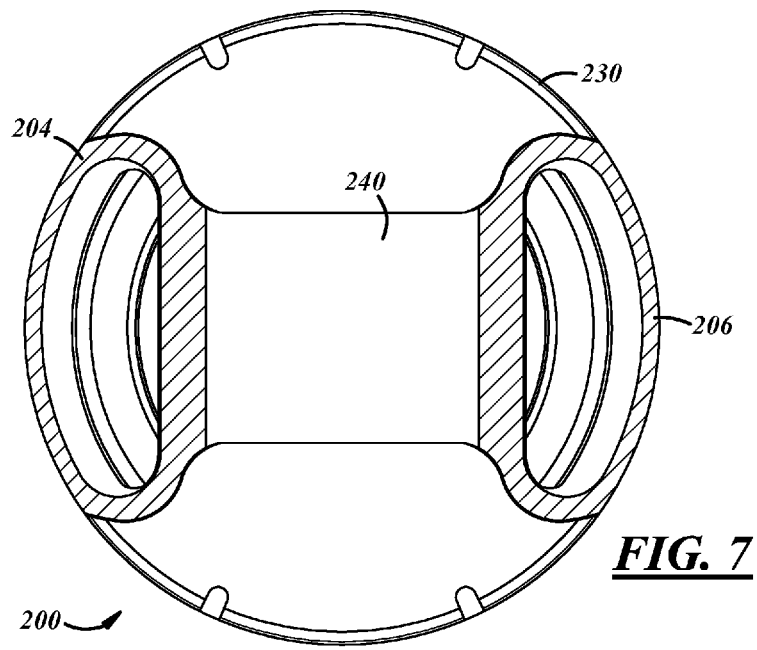
Figure 8:
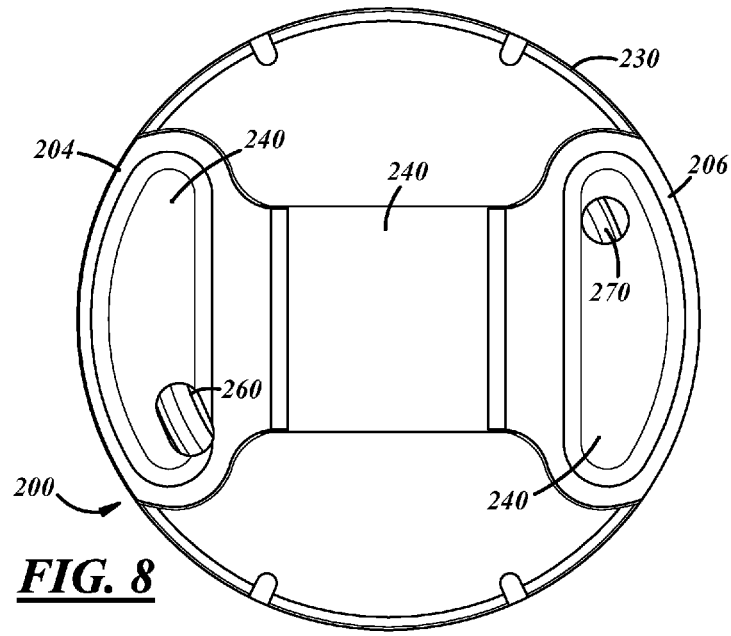

FIGS. 6-8 depict an alternate embodiment of the invention. FIG. 6 is a cross-sectional view, FIG. 7 is a view taken along lines 7-7 in FIG. 6 and in the direction of the arrows, and FIG. 8 is a view of the bottom of the piston.

The alternate piston embodiment is referred to by the numeral 200. The piston 200 differs from the piston embodiment 10 described above principally with respect to the size and structure of the cooling gallery 210. Other features of the piston 200, including bonding two forged sections (crown portion 220 and lower body portion 230) together, providing a pocket 240 for a ball-type end of a connecting rod, retaining the ball-type end in the piston by retaining members, are all the same as described above.

The cooling gallery 210 extends substantially the full length (height) of the boss members 204 and 206. The bottom walls 240 of the cooling gallery 210 are located at the lower ends of the boss members 204, 206, that is at the opposite end of the piston from the crown portion 200 and combustion bowl 250.

Openings 260 and 270 are produced in the bottom walls 240 for ingress and egress of cooling oil into and from the cooling gallery 210. These are substantially the same as openings 100 and 102 described above with respect to FIGS. 1-5.

The positions of the lower walls 240 in the boss members 204 and 206 allows the oil in the cooling gallery 210 to reach a higher velocity before striking or making contact with the upper surfaces of the cooling gallery which can increase the cooling effect of the oil.

In addition, since the lower walls 240 of the cooling gallery are positioned near the bottom of the skirt portion, the skirt will be stiffer. With a stiffer bottom of the skirt, the piston should rock less during operation.

Positioning the lower gallery wall at or near the bottom of the skirt portion also benefits machining the piston. It will allow better tolerances since the deflection of the bottom of the skirt is reduced.

Figure 9:
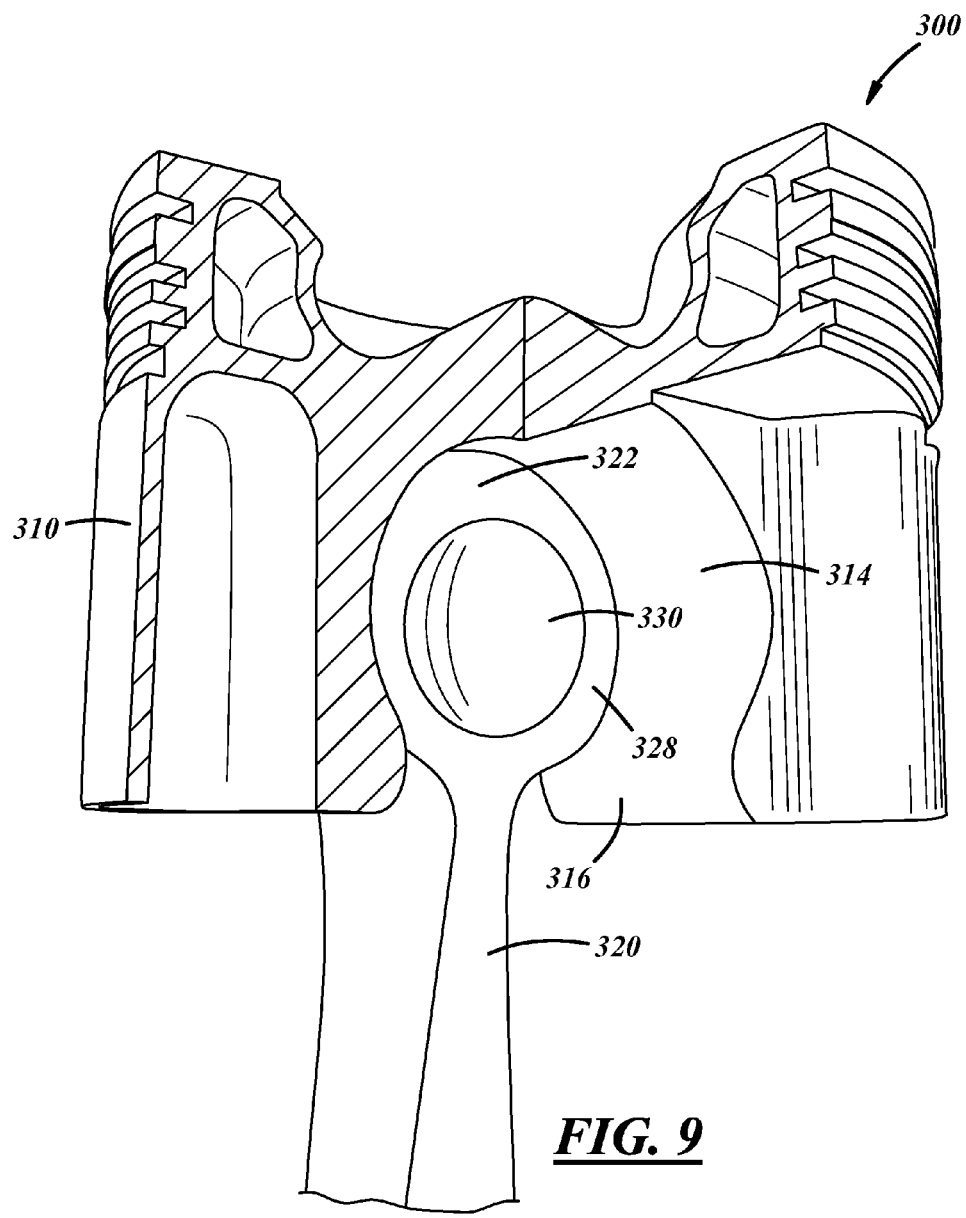
FIGS. 9, 10, an 11 depict another alternate embodiment of the invention.
Figure 10:
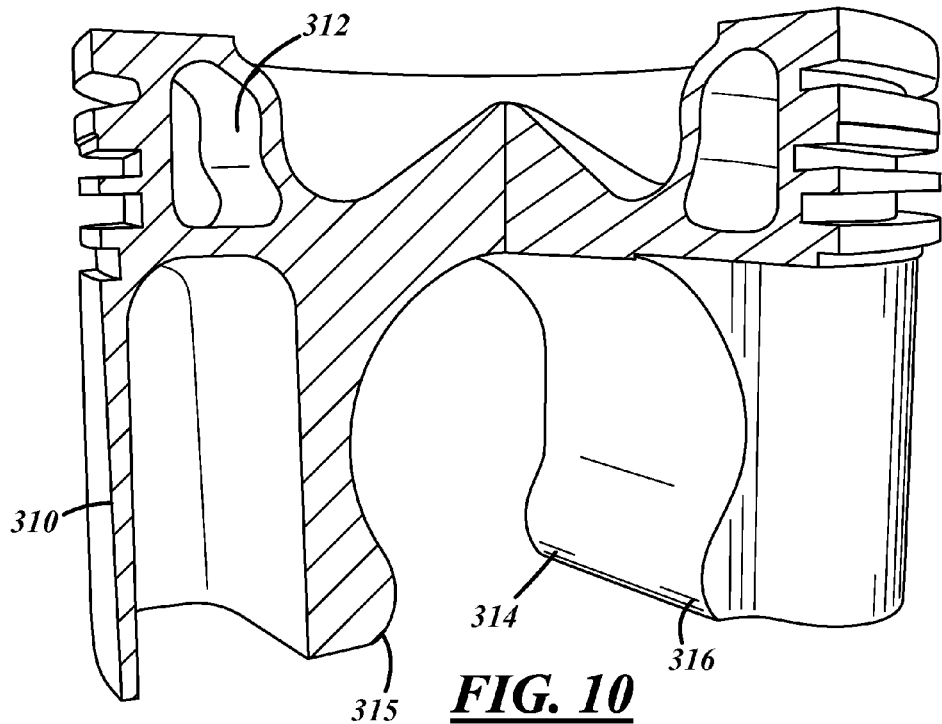
Figure 11:
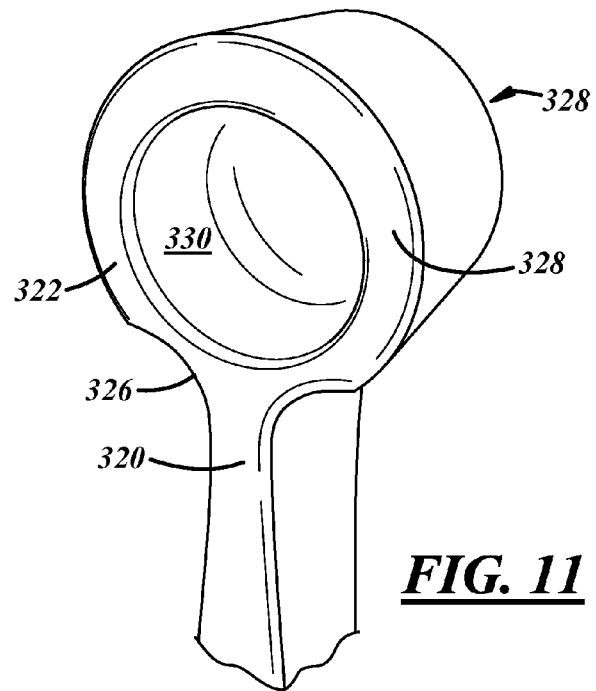

Another embodiment of the invention is shown in FIGS. 9-11 and indicated generally at 300. The assembly 300 includes a piston member 310 and a connecting rod 320.

The piston member 310 is similar to the piston members described above with respect to how it is formed and the material from which it is made. The piston member 310 also has a cooling gallery 312 which is essentially the same as, and made in the same way as, the cooling galleries discussed and depicted above.

The piston member 310 differs from the piston members discussed above relative to its socket 314 (or "pocket") and the manner in which the connecting rod 320 is connected to it. The socket has an opening which is cylindrically-shaped and matches the cylindrically-shaped ball 322 on the small end of the connecting rod 320.

The connecting rod 320 has an elongated shaft member 324, only a portion of which is depicted, and a ball member 322 at its small end. The ball has a cylindrical shape as shown in the drawings.

When the connecting rod 320 is assembled to the piston member 310, the ball member 322 is inserted into the socket 314 from the side, that is, in a direction transverse to the longitudinal direction of the connecting rod. In FIG. 9, the ball member 322 is only partially inserted into the socket.

The lower ends 315, 316 of the socket hold the connecting rod in place in the longitudinal direction. The ends 315, 316 extend into the area formed by the neck 326 of the connecting rod.

Preferably, the two sides 328 of the cylindrically-shaped ball 322 have one or more recesses or depressions 330. The recesses decrease the weight and mass of the connecting rod.

Although the invention has been described with respect to preferred embodiments, it is to be also understood that it is not to be so limited since changes and modifications can be made therein which are within the full scope of this invention as detailed by the following claims.

What is claimed is:

1. A piston and connecting rod assembly comprising:
a piston body having an upper crown member and a lower body portion, said upper crown member and lower body portion being integrally bonded together to form a one-piece piston body;
said piston body having a cooling gallery formed between said upper crown member and said lower body portion;
said lower body portion having a piston boss, said boss including a pocket for receipt of a connecting rod and a pair of grooves;
said connecting rod having a ball-type end, said ball-type end being positioned in said pocket; and
further comprising fastener members for securing said ball-type end of said connecting rod in said pocket and preventing rotation of said piston body around a longitudinal axis of said connecting rod, wherein said fastener members comprise C-clips positioned in said grooves in said boss.

2. The piston and connecting rod assembly as described in claim 1 wherein said cooling gallery comprising a closed gallery.

3. The piston and connecting rod assembly as described in claim 2 further comprising a plurality of openings extending into said cooling gallery for ingress and egress of oil.

4. The piston and connecting rod assembly as described in claim 1 wherein said ball-type end of said connecting rod has two opposed planar surfaces and a first curved surface therebetween.

5. The piston and connecting rod assembly as described in claim 4 wherein said pocket in said boss has a second curved surface corresponding in shape to said first curved surface.

6. The piston and connecting rod assembly as described in claim 1 wherein said ball-type end has a width substantially equal to the width of said pocket.

7. The piston and connecting rod assembly as described in claim 1 wherein said ball-type end has a pair of planar surfaces and is adapted to be positioned initially in said pocket 90° from a final operating position.

8. The piston and connecting rod as described in claim 1 further comprising a plurality of piston ring grooves in said piston body.

9. The piston and connecting rod as described in claim 8 wherein at least one of said piston ring grooves are located in said crown member.

10. The piston and connecting rod as described in claim 1 wherein said ball-type end is cylindrically shaped.

11. The piston and connecting rod as described in claim 10 wherein said ball-type end has two substantially planar side surfaces, and a curved, cylindrically shaped peripheral outer surface.

12. The piston and connecting rod as described in claim 11 further comprising at least one recess in at least one of said two side surfaces.

13. The piston and connecting rod as described in claim 11 further comprising at least one recess in each of said side surfaces.

14. A piston comprising:
a piston body having an upper crown member and a lower body portion, said upper crown member and lower crown member being integrally bonded together to form a one-piece position body;
said piston body having a cooling gallery formed between said upper crown member and said lower body portion;
said lower body portion having a piston boss, said boss including a pocket for receipt of an end of a connecting rod; and further comprising a pair of grooves adjacent said pocket, said grooves adapted to receive C-clip fasteners for securing the connection rod in place and preventing rotation of said connecting rod about a longitudinal axis of the piston.

15. The piston as described in claim 14 wherein said cooling gallery comprising a closed gallery.

16. The piston as described in claim 15 further comprising a plurality of openings extending into said cooling gallery for egress of oil.

17. The piston and connecting rod as described in claim 14 wherein said pocket is cylindrically-shaped.

* * * * *